(12) United States Patent
Jetty et al.

(10) Patent No.: US 12,032,608 B1
(45) Date of Patent: Jul. 9, 2024

(54) SYSTEMS AND METHODS FOR GENERATING QUERY SUGGESTIONS

(71) Applicant: Walmart Apollo, LLC, Bentonville, AR (US)

(72) Inventors: Rajasekhar Jetty, Austin, TX (US); Venkata P K Boggavarapu, San Ramon, CA (US); Yogananda Domlur Seetharama, Baton Rouge, LA (US); Neeraj Sharma, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/106,071

(22) Filed: Feb. 6, 2023

(51) Int. Cl.
*G06F 16/00* (2019.01)
*G06F 16/332* (2019.01)
*G06F 16/335* (2019.01)
*G06F 16/9535* (2019.01)

(52) U.S. Cl.
CPC ........ *G06F 16/3322* (2019.01); *G06F 16/335* (2019.01); *G06F 16/9535* (2019.01)

(58) Field of Classification Search
CPC .................................................. G06F 16/3322
See application file for complete search history.

(56) References Cited

U.S. PATENT DOCUMENTS

| | | | |
|---|---|---|---|
| 9,336,211 B1 * | 5/2016 | Bousquet | G06F 16/48 |
| 9,613,165 B2 | 4/2017 | Frieden | |
| 11,132,405 B2 | 9/2021 | Mishra | |
| 11,341,175 B2 | 5/2022 | Lin | |
| 2021/0192134 A1 | 6/2021 | Yue | |
| 2022/0050877 A1 | 2/2022 | Kang | |

FOREIGN PATENT DOCUMENTS

WO 2021077585 4/2021

OTHER PUBLICATIONS

Bentley, Jon et al.; "Ternary Search Trees"; https://www.cs.upc.edu/~ps/downloads/tst/tst.html; 1999; pp. 1-8.
Wikipedia; "Priority queue"; https://en.wikipedia.org/wiki/Priority_queue; Jan. 2, 2023; pp. 1-12; Retrieved from Internet Archive Wayback Machine https://web.archive.org/web/20230201024115/https://en.wikipedia.org/wiki/Priority_queue on May 3, 2023.
Gupta, Jai et .; "Personalized Online Spell Correction for Personal Search"; Proceedings of the 2019 World Wide Web Conference, May 13-17, 2019, San Francisco, CA, USA; pp. 1-7.

* cited by examiner

*Primary Examiner* — Ajith Jacob
(74) *Attorney, Agent, or Firm* — Foley IP Law, PLLC

(57) ABSTRACT

In some embodiments, apparatuses and methods are provided herein useful to generating query suggestions. In some embodiments, a system for generating query suggestions for retail comprises a database comprising a query index including queries and query scores, and a control circuit configured to receive a query prefix from a user interface of a retail channel, retrieve, from the query index and based on the query prefix, query correction candidates, calculate edit distances for each of the query correction candidates, select, based on the edit distances, one or more query suggestions from the query correction candidates, calculate, based on the edit distances, a prefix completion cost for each of the query suggestions, calculate, based on the prefix completion costs and the query scores, the query correction costs for each of the query suggestions, and sort, based on the query correction costs, the query suggestions.

20 Claims, 14 Drawing Sheets

FIG. 4

$$F1 = 1 - \frac{1}{1 + e^{-(x-180)/36}}$$

$$F2 = \frac{1}{e^x}$$

$$F3 = \frac{1}{1 + e^{(x-90)/18}}$$

$$F4 = 1 - \frac{\log(1+x)}{\log 366}$$

$$F5 = 1 - \frac{x}{366}$$

FIG. 6

| vlined 1 get prefix node based on channel (prefix, channel) |
|---|
| 1: *currNode ← TSTrooot*          ▷ (Start from root node) |
| 2: *currChar ← prefix[0]*          ▷ (First character of prefix) |
| 3: *pos ← 0* |
| 4: while *currNode ≠ null & currNode.channel == channel* do    ▷ (Traversing over tree considering properties of TST) |
| 5:   if *currChar < currNode.key* then |
| 6:     *currNode ← currNode.left* |
| 7:   else if *currentChar > currentNode.key* then |
| 8:     *currentNode ← currentNode.right* |
| 9:   else |
| 10:    *pos ← pos+1* |
| 11:    if *pos == prefix.length* then  ▷ (Note: Found the final node as reached to node with last character of prefix) |
| 12:      return *currNode* |
| 13:    else |
| 14:      *currNode ← currNode.center*  ▷ (Traverse center node of TST |
| 15:      *currChar ← prefix[pos]*  for next character of prefix string) |
| 16:    end if |
| 17:  end if |
| 18: end while |
| 19: return *currNode* | vlined 2 get top matching queries (prefix, channel, requiredSuggestions)

1: Initialized topMatches ← [ ]
2: prefixNode ← getPredfixNode(prefix, channel)     ▷ (Note: getPrefixNode fetches the first node from TST which matches prefix)
3: if prefixNode ≠ null then
4:     node ← TSTNode(prefixNode)
5:     node.left ← null
6:     node.right ← null
7:     Initialize queue: MinMaxPriorityQueue of size requiredSuggestions
                                           ▷ (Note: This queue works as a heap)
8:     fill queue with node
9:     while queue.size > 0 and topMatches.size > requiredSuggestions do
10:        currentNode ← poll from queue
11:        if currentNode is terminal and has matching channel then
12:            if currentNode has maximum score then
13:                add it in topMatches list
14:            end if
15:        end if
16:        Insert left child of currentNode if it has higher score than max score of queue items
17:        Insert right child of currentNode if it has higher score than max score of queue items
18:        Insert center child of currentNode if it has higher score than max score of queue itmes
                ▷ (Note: Considering all children (left, right and center) of currentNode for insertion in queue based on comparison with maximum score item of current queue)
19:    end while
20: end if
21: return topMatches
22: ▷ Breadth First Search (BFS) based algorithm to traverse TST and fetch top matching query suggestions for prefix based on channel

| vlined 3 rerankQueries (topMatchesList) |
|---|
| 1: *rerankFlag* ← *is RerankEnabled*() ▷ (Note: Its decided based on exploration probablilty and is a tunable parameter) |
| 2: if *rerankFlag* then |
| 3:     sort query suggestion in decreasing order of exponential score |
| 4:     return sorted topMatchesList |
| 5: else |
| 6:     return topMatchesList |

FIG. 10 vlined 5 prefixCompletionCost (prefix, target)

1: *prefixLength ← prefix.length*
2: *targetLength ← target.length*
3: *editDistance ← 0*
4: *minValue ← canstant value*
5: *prefixCompletionCost ← array of type double of size targetLength*
6: *editDistance ← 0*
7: *distanceMatrix ← matrix of size (prefixLength, targetLength)*
8: for *i=0; i <prefixLength; i++* do
9:     for *j = 0; j <targetLength; j++* do
10:         if *i== 0* then
11:             *distanceMatrix[i][j] = j*
12:         else if *j== 0* then
13:             *distanceMatrix[i][j] = i*
14:         else if *prefix[i - 1]==target [j - 1]* then
15:             *distanceMatrix[i][j] = min(distanceMatrix[i − 1][j], distanceMatrix[i][j - 1], distanceMatrix[i - 1][j - 1])*
16:         else
17:             *distanceMatrix[i][j] = 1 + min(distanceMatrix[i − 1][j], distanceMatrix[i][j - 1], distanceMatrix[i - 1][j - 1])* ▷ (Note: This way we will compute edit distance between target and prefix till ith position of prefix and jth position of target)
18:         end if
19:     end for
20: end for
21:
22: for *i = 0; i <prefixLength; i++* do    ▷ (Note: Now we will compute the final prefix completion cost)
23:     *prefixCompletionCost[i] = distanceMatrix[prefixLength][i] + prefixUnitCost * (targetLength - i)*
24:     if *prefixCompletionCost[j] < minValue* then
25:         *minValue = prefixCompletionCost[i]*
26:         *editDistance = dist[prefixLength][i]*
27:     end if
28: end for
29: return *minValue, editDistance*

FIG. 11 vlined 4 prefixCorrectionFlow (prefix)
1: if *spellCorrection enabled* then
2:     *allSuggestions* ← []
3:     *suggestions* ← *getAllSuggestionsForPrefixFromCatalogue()*
4:     for s : *suggestions* do
5:         Compute *prefixCompleteCost* score for s having score >= threshold
6:         if *editDistance(s)* <= 2 then
7:             *candidateTotalCost* = *prefixCompletionCost* + 0.7 * (1 - $\frac{\log(queryScore)}{\log(maxQueryScore)}$)
8:             *add s to allSuggestions*
9:         end if
10:     end for
11:     Sort *allSuggestions* in increasing order of *candidateTotalCost*
12:     return *allSuggestions*

FIG. 14

| METRIC | CONTROL | TEST |
|---|---|---|
| VISITOR CONVERSTION | 14.31% | 14.33% |
| ORDER CONVERSTION | 35.45% | 35.62% |
| AUTOSUGGEST USAGE RATE (VISITOR LEVEL) | 40.38% | 62.62% |
| AUTOSUGGEST USAGE RATE (HIT LEVEL) | 26.19% | 43.02% |
| NULL SEARCH RATE | 10.77% | 7.12% |
| SEARCH CONVERSION RATE | 14.25% | 14.29% |
| PRODUCT RECO USAGE RATE (VISITOR LEVEL) | 14.78% | 16.10% |

SYSTEMS AND METHODS FOR GENERATING QUERY SUGGESTIONS

CROSS-REFERENCE TO RELATED APPLICATIONS

This application is related to patent application Ser. No. 18/106,371 entitled SYSTEMS AND METHODS FOR GENERATING QUERY SUGGESTIONS, filed on Feb. 6, 2023, which is incorporated herein by reference in its entirety for all purposes.

TECHNICAL FIELD

This invention relates generally to system for generating query suggestions for retail services and e-commerce.

BACKGROUND

E-commerce services generally provide a user interface for customers to interact with product and service offerings. A search function is often provided within the user interface for users looking for product and information using a text-based query.

BRIEF DESCRIPTION OF THE DRAWINGS

Disclosed herein are embodiments of systems, apparatuses and methods pertaining to generating query suggestions for retail services. This description includes drawings, wherein:

FIG. 4 depicts exemplary decay formulas in accordance with some embodiments.

FIG. 6 is an example pseudocode for identifying a prefix node based on a retail channel in accordance with some embodiments.

FIG. 7 is an example pseudocode for retrieving query candidates and query scores and selecting query suggestions in accordance with some embodiments.

FIG. 8 is an example pseudocode for reranking query suggestions based on exponential scores in accordance with some embodiments.

FIG. 10 is an example pseudocode for calculating edit distances and prefix completion costs in accordance with some embodiments.

FIG. 11 is an example pseudocode for selecting query suggestions from query correction candidates in accordance with some embodiments.

FIG. 14 is a table showing exemplary A/B test results improvements in accordance with some embodiments.

Figure 1:
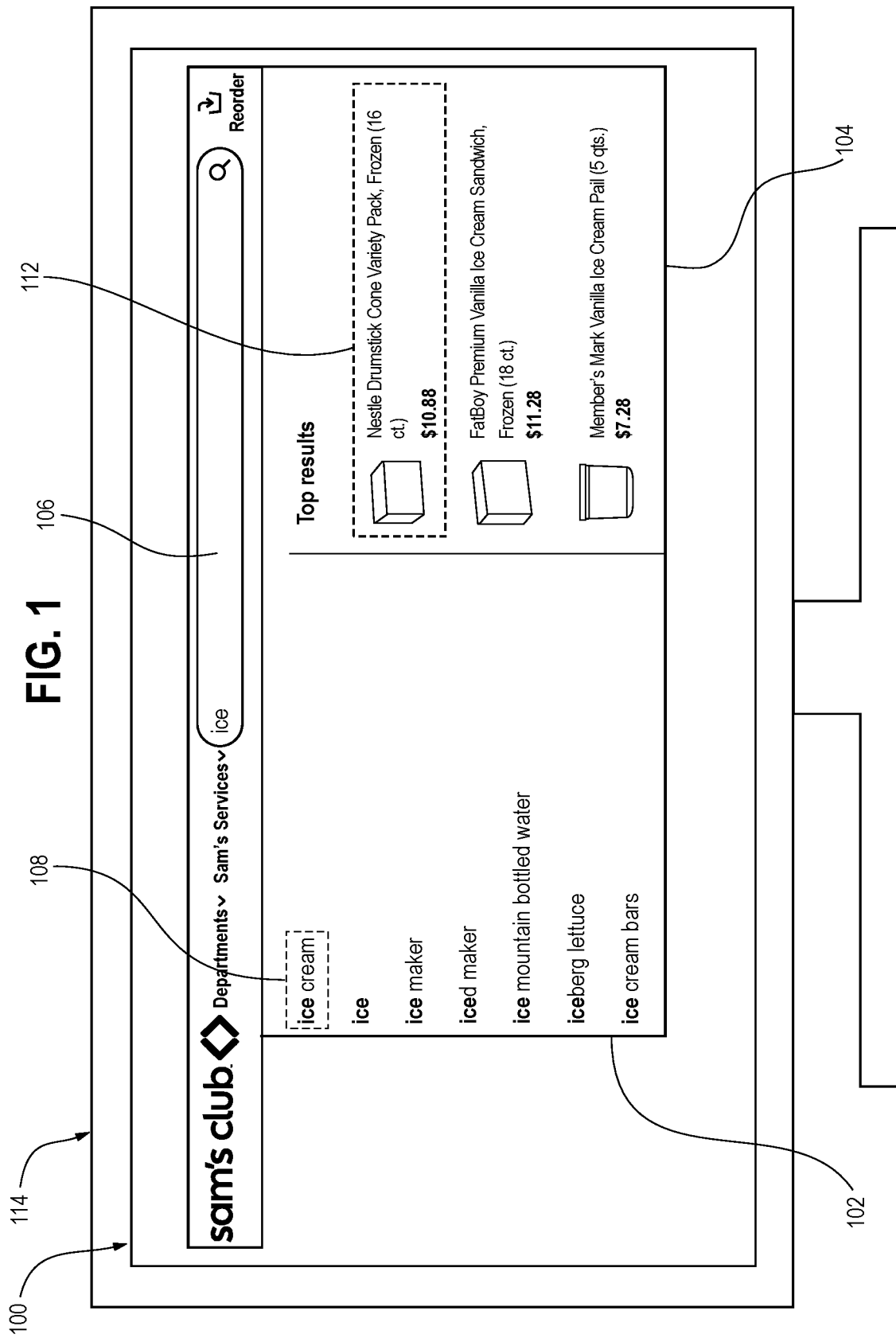
FIG. 1 depicts an example graphical user interface (GUI) in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to provide query suggestions based on a query prefix entered by a user. In some embodiments, a system for generating query suggestions for retail comprises a database comprising a query index, the query index comprising a search tree having a plurality of nodes, each of the plurality of nodes comprising a query and one or more query scores for the query, and a control circuit coupled to the database and configured to receive a query prefix from a user interface of a retail channel, retrieve, based on the query prefix, query candidates and the query scores corresponding to the query candidates from the search tree of the query index, and select, based on the query scores corresponding to the query candidates, one or more query suggestions from the query candidates.

In some embodiments, systems are provided that may increase customers' usage of the query suggestions. Further, systems according to some embodiments also enable reducing null query suggestion results. Furthermore, systems according to some embodiments may improve the performance and throughput of query suggestions and reduce the latency in providing query suggestions.

Retail services and e-commerce platforms typically provide query suggestions, product suggestions, and prefix corrections by using multiple separate third-party microservices. In some embodiments of the systems and methods described here, processes for providing query suggestion, product suggestions and/or pre-fix correction are computationally efficient such that they may all be executed on the processor and RAM of a single computing device to remove the latency associated with calls to and responses from microservices. For example, each of these processes may be executed on a retailer controlled and managed server machine having 24 GB or less. In some tests of some embodiments of the described process, the performance and throughput of typeahead increased by 89% and latency reduced from 225 ms to 25 ms.

FIG. 1 depicts an exemplary graphical user interface (GUI) 100 including a query suggestion section 102, and a product suggestion section 104, and a search bar 106 where a user may enter a query prefix. While FIG. 1 provides several example aspects, embodiments are not limited to these enumerated aspects. For example, the GUI 100 may include any other suitable or desired information. The GUI 100 may be presented in any suitable manner. For example, the GUI 100 may be presented via a display device such as a display panel 114.

The query suggestions section 102 may include one or more query suggestions 108. The product suggestions section 104 may include one or more product suggestions 110. In some embodiments, each of the product suggestions may include product information, including, for example, a brand name of the product, a picture of the product, a size of the product, a price of the product, and other relevant information. While FIG. 1 illustrates a desktop e-commerce user interface, in some embodiments, the systems and methods described herein may be used to provide query suggestions and product suggestions via mobile applications on mobile devices (such as computers, tablets, phones, wearable devices), in-store kiosks, customer-service terminals, and as a service in a third-party user interface.

Figure 2:
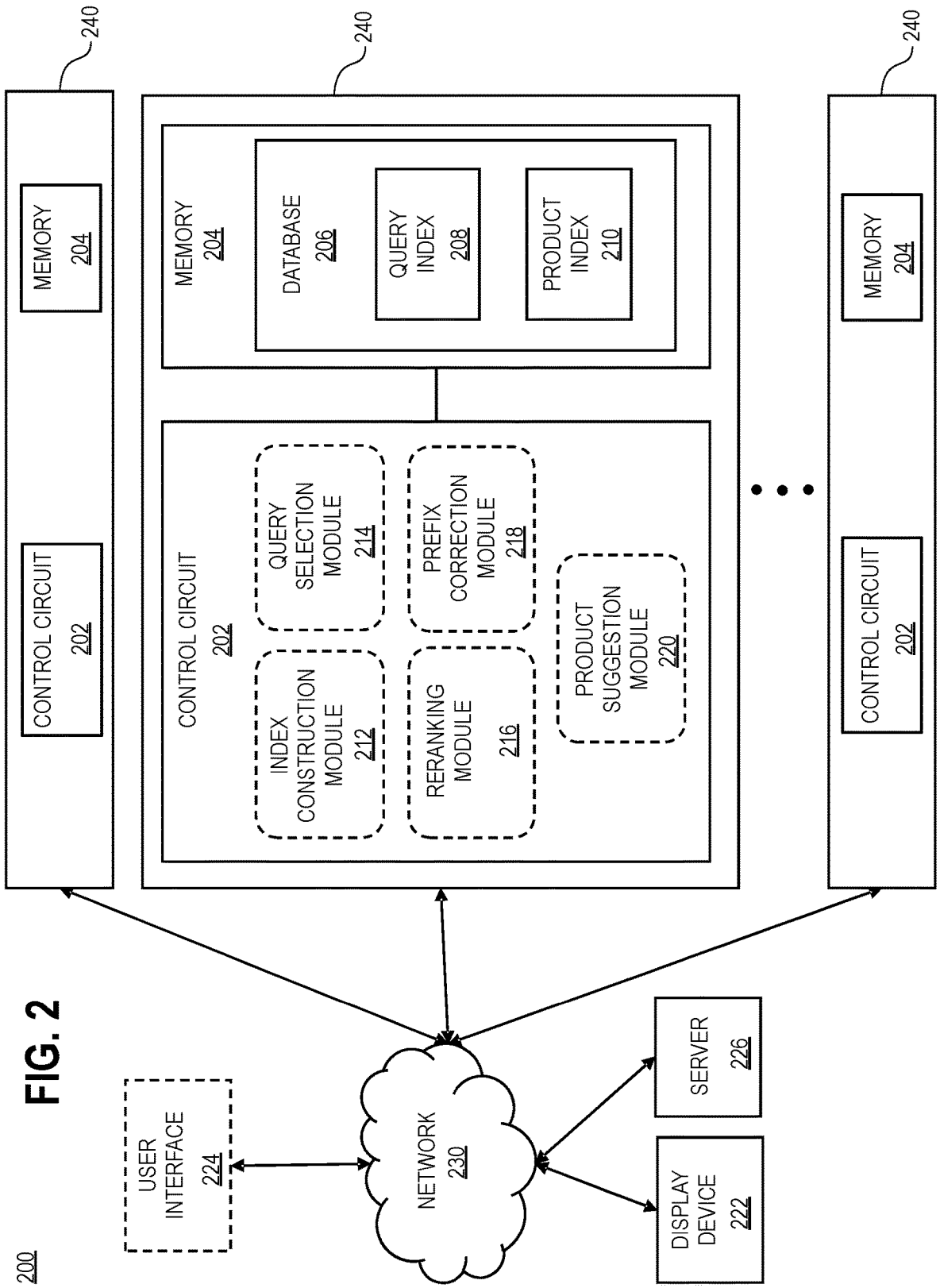
FIG. 2 is a block diagram of an exemplary system for generating query suggestions in accordance with some embodiments.

FIG. 2 is a block diagram of a system 200 for generating query suggestions. The system 200 may include a computing device 240, a user interface 224, a display device 222, and a server 246. In some embodiments, the system 200 may include a plurality of computing devices 240. The computing devices 240, the user interface 224, the display device 222, and the server 226 may be communicatively connected via a network 230. The network 230 can be any suitable type of network, such as an intranet and/or an internet (e.g., the Internet). Accordingly, some, none, or all of these components can be local to and/or remote from one another. The user interface 224 may be presented via the display device 222. In some embodiments, the user interface 224 may be a GUI 100.

In some embodiments, the server 226 may store data related to the retail service. The server 226 may include clickstream data. The clickstream data may include the information collected about users' visits and behavior while the users browse through retail websites or use online retail platforms. In some embodiments, clickstream data may be aggregated by following a click path of the user via cookies or hyperlinks. In some embodiments, clickstream data may record user interactions with the query suggestion. For example, click rate, subsequent add-to-cart rate, and subsequent purchase rate, etc. In some embodiments, the server may provide a binary large object (BLOB) storage. Blob Storage may store unstructured object data. A BLOB can be any type of text or binary data, such as a document, media file, or application installer. The clickstream data may be stored in the server as BLOBs.

The computing devices 240 may comprise a control circuit 202 and a memory 204. The control circuit 202 is configured, for example by using corresponding programming, to carry out one or more of the steps, actions, and/or functions described herein. The control circuit 202, for example, may comprise a fixed-purpose hard-wired hardware platform including but not limited to an application-specific integrated circuit (ASIC), a field-programmable gate array (FPGA), and the like or comprise a partially or wholly programmable hardware platform including but not limited to microcontrollers, microprocessors, and the like. The ASIC may be an integrated circuit that is customized by design for a particular use, rather than intended for general-purpose use.

In some embodiments, the control circuit 202 may operably couple to a memory 204. In some embodiments, the memory 204 may be integral to the control circuit 202. In some embodiments, the memory 204 may include a volatile and/or non-volatile memory. In some embodiments, the memory 204 may include a random-access memory (RAM). In one approach, the memory 204 may include a twenty-four-gigabyte (24 GB) RAM. The memory may serve to store computer instructions that, when executed by the control circuit 202, cause the control circuit 202 to behave as described herein. In some embodiments, the memory 204 may serve, for example, to non-transitorily store computer instructions. As used herein, this reference to "non-transitorily" will be understood to refer to a non-ephemeral state for the stored contents (and hence excludes when the stored contents merely constitute signals or waves) rather than volatility of the storage media itself and hence the may include both non-volatile memory (such as read-only memory (ROM) as well as volatile memory (such as an erasable programmable read-only memory (EPROM).

In some embodiments, the memory 204 may include a database 206. When the computer instructions are executed by the control circuit 202, the computer instructions may cause the control circuit 202 to communicate with the database. The database 206 may include a query index 208.

Figure 3:
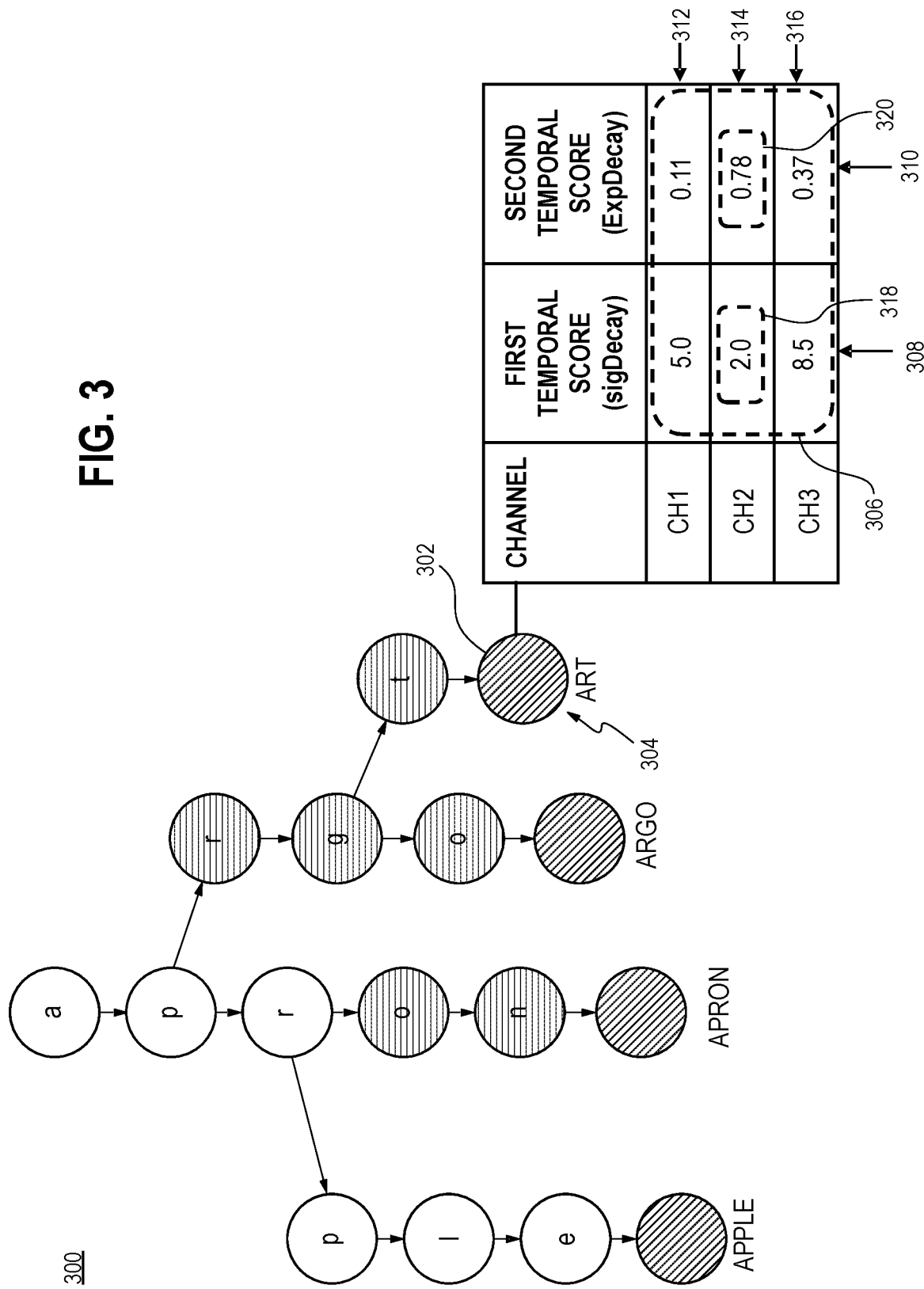
FIG. 3 depicts an example of a part of a search tree in accordance with some embodiments.

The query index 208 may include a search tree to store queries. FIG. 3 depicts a part of the ternary search tree (TST) 300 in accordance with some embodiments. The TST 300 may comprise a plurality of nodes 302 and a structure for storing character strings. The nodes 302 of the TST 300 are in order with respect to the queries. The TST 300 may have at most three children per a parent node. Each node 302 of the TST may store a single character. In some embodiments, the nodes of the TST may be associated with the queries. In some embodiments, one node 302 may be associated with a single query 304. In some embodiments, each of the nodes 302 associated with queries may include a query 304 corresponding to the node 302 and one or more query scores 306 of the query associated with that node. In some embodiments, the TST 300 may be built by inserting each character of the queries into each node of TST in sequential order following construction rules of the TST structure. When there are no more characters left in the query to be inserted into a node, the node having the last character of the query may be a terminal node. Terminal nodes of the TST 300 may represent a complete query and the query may be extracted by traversing the path from a root node to the terminal node during the retrieval time. The structure of the TST 300 may change based on the insertion order of queries but the overall average time complexity of extracting the queries may remain relatively the same.

In some embodiments, the query scores 306 may be temporal scores based on a passage of time from an occurrence of one or more events related to the query. One or more events may include but are not limited to clicks related to the query, adding items related to the query to a cart, ordering items related to the query, visiting items related to the query, and so on.

The temporal scores may decrease according to the passage of time from the occurrence of events related to the query. In some embodiments, the passage of time from the occurrence of events may be measured based on date. The temporal scores may also be based on the number of occurrences of events related to the query. For example, the temporal scores may be an aggregated score of the scores for each event such that a query with more frequent occurrences of events may have a higher score than a query with less frequent occurrences of events. The information on the occurrences of events may be extracted from the clickstream data of the previous 365 days.

In some embodiments, the temporal scores may be based on one or more decay functions using a passage of time from the occurrence of the event as a variable. FIG. 4 are decay formulas that may be based on the temporal scores in accordance with some embodiments. In some embodiments, the temporal scores may be based on one of the decay functions F1, F2, F3, F4, and F5 in FIG. 4. Referring to FIG. 4, the formula F1 may represent a sigmoid decay function. The formula F2 may represent an exponential decay function. The formula F3 may represent a variation of sigmoid decay function (sig_var decay function). The formula F4 may represent a logarithmic decay function. The formula F5 may represent a linear decay function. In each formula, a passage of days from the occurrence of the event may be used as a variable (x). For example, if a customer clicked items related to the query six days before, the number 6 may be used as the variable x in each formula. In some embodiments, the information on the occurrences of events may be extracted from the clickstream data of the previous 365 days such that the maximum value of the variable x in each formula may be 365.

Figure 5:
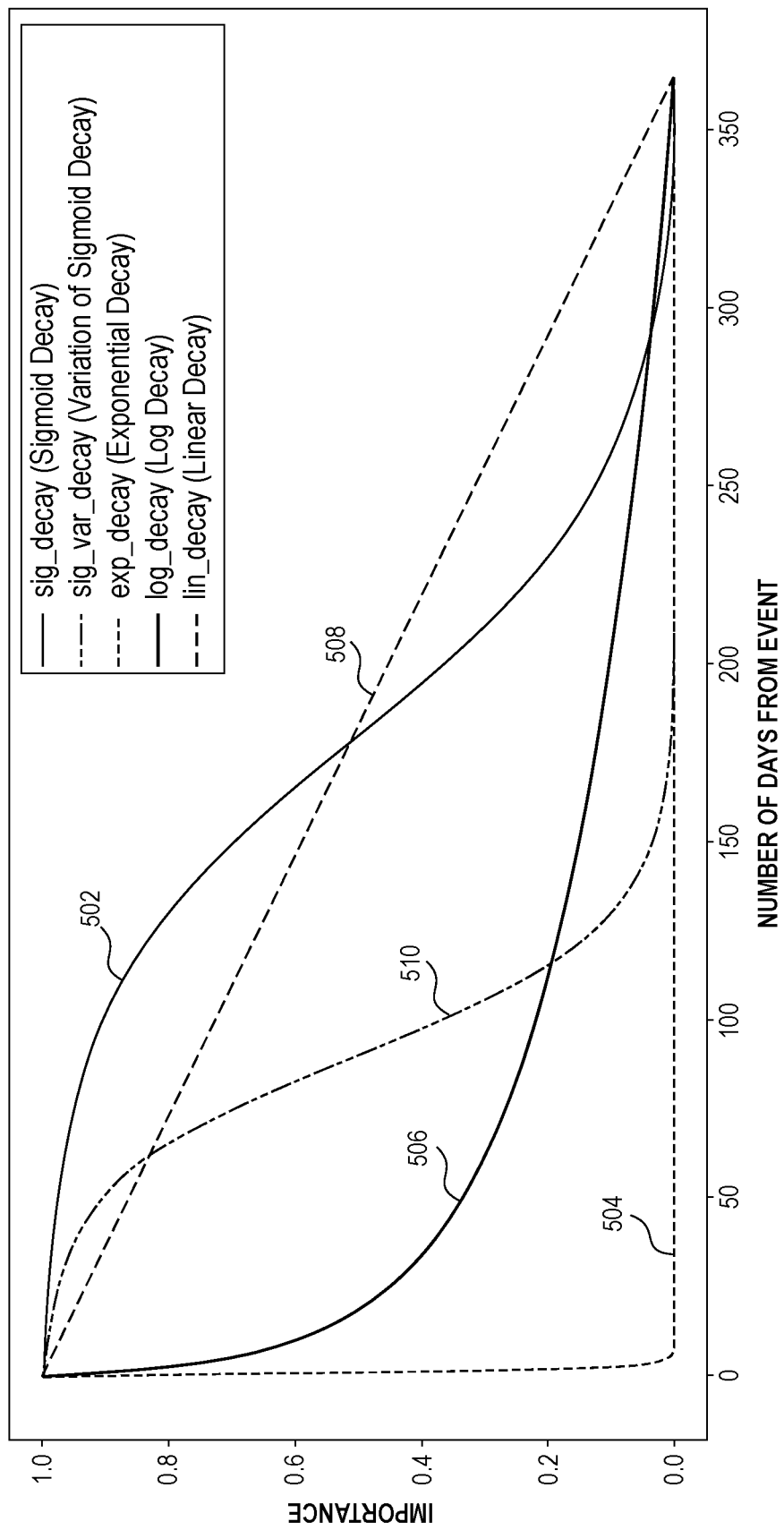
FIG. 5 depicts exemplary graphs of a sigmoid decay function, an exponential decay function, a logarithmic decay function, a variation of sigmoid decay function, and a linear decay function in accordance with some embodiments.

FIG. 5 depicts a graph 502 of the sigmoid decay function (formula F1), a graph 504 of the exponential decay function (formula F2), a graph 506 of the logarithmic decay function (formula F4), a graph 508 of the linear decay function (formula F5), a graph 510 of the sig_var decay function (formula F3) using a passage of days as a variable (x). In the sigmoid decay graph 502, the function value decreases relatively gradually. Compared to the sigmoid decay graph 502, in the exponential decay graph 504, the function value decreases steeply. For example, the exponential function value remains almost constant after the function value rapidly decreases during the first few days. The graph 508 of the linear decay function represents a constant rate of decay. The graph 510 of the sig_var decay function decays faster in comparison to the sigmoid decay function represented by the graph 802 and almost reaches zero when a variable (x) is 180.

Referring back to FIG. 3, in some embodiments, query scores 306 at each node of the search tree may include more than one type of temporal score. For example, query scores 306 at each node of the search tree may include first temporal scores 308 based on a first decay function and second temporal scores 310 based on a second decay function which is different from the first decay function. For example, the first temporal score may be based on the sigmoid decay function (SigDecay) represented by the formula F1 in FIG. 4 and the second temporal score may be based on the exponential decay function (ExpDecay) represented by the formula F2 in FIG. 4. Although FIG. 3 depicts two types of the temporal scores, the number of types of the temporal scores may not be limited to two. Therefore, in some embodiments, the query scores 306 may include more than two types of temporal scores, for example, the first temporal score, the second temporal score, and a third temporal score based on a third decay function which is different from the first and second decay functions.

In some embodiments, the system 200 may be for a plurality of retail channels. The plurality of retail channels may include, but not be limited to, various channels and various platforms such as a retail website for desktops, a retail application for mobile devices, a retail channel via a third-party platform, and so on. When the system 200 is for a plurality of retail channels, the query scores 306 at each node 302 may comprise channel-specific query scores 312, 314, 316. Each of the channel-specific query scores 312, 314, 316 may correspond to one of the plurality of retail channels CH1, CH2, CH3. For example, the query scores 306 may comprise channel-specific scores 312 for a first channel CH1, channel-specific scores 314 for a second channel CH2, and channel-specific scores 316 for a third channel CH3. Although FIG. 3 illustrates three channels, the number of channels may not be limited to three. Therefore, the system may be for more or less than three retail channels.

Referring to FIG. 3, the channel-specific query scores 312, 314, 316 for each of the plurality of retail channels may include more than one type of temporal score. In some embodiments, the channel-specific scores for each of the plurality of retail channels include a first channel-specific temporal score 318 based on a first decay function and a second channel-specific temporal score 320 based on a second decay function which is different from the first decay function. In some embodiments, the first channel-specific temporal scores (SigDecay scores) 318 may be based on the sigmoid decay function represented by the formula F1 in FIG. 4, and the second channel-specific temporal scores (ExpDecay scores) 320 may be based on the exponential decay function represented by the formula F2 in FIG. 4.

When the query scores 306 at each node comprises query scores for a plurality of retail channels and based on a plurality of decay functions, the query scores at each node may be stored at each node as a matrix. The rows of the matrix may represent retail channels and the columns of the matrix may represent the decay functions used to calculate the query scores or vice versa.

Referring back to FIG. 2, the database 206 stored in the memory 204 may further include a product index 210. The product index 210 may include product information, including, for example, a related query, a category of the product, a brand name of the product, a picture of the product, a size of the product, inventory quantity, out-of-stock information, a price of the product, and/or other relevant information. The product index 210 may further include product affinity scores based on the clickstream data of each product with decay rate on the interactions such as click, adding to a card, on order, and so on.

In some embodiments, the control circuit 202 may execute one or more modules performing tasks based on computer readable instructions and other data stored on the memory 204. In some embodiments, as depicted in FIG. 2, the control circuit 202 may include an index construction module 212, a query selection module 214, a reranking module 216, and a prefix correction module 218. In some embodiments, the index construction module 212, the query selection module 214, the reranking module 216, and the prefix correction module 218 may be executed using 24 GB or less of RAM of the memory 204.

The index construction module 212 may be configured to construct and update the query index 208. In some embodiments, the index construction module 212 may construct the query index having the TST 300 by inserting each character of the queries into each node of the TST 300 in sequential order following construction rules of the TST structure. In some embodiments, the index construction module 212 may create a new node for each character of the query sequentially when there is no node available in the TST 300. In some embodiments, the index construction module may align with existing nodes in the TST 300 when there are nodes available in the TST 300. The index construction mode 212 may mark a node as a terminal node when there are no more characters left in the query to be inserted. Terminal nodes of TST may represent a complete query. In some embodiments, to construct the query index, the index construction module 212 may calculate query scores for queries based on the clickstream data. The index construction module 212 may calculate temporal scores for each query based on a passage of time from an occurrence of clickstream events related to each query. In some embodiments, when temporal scores are based on more than one event, the events may be weighted in calculating the temporal scores. For example, when a temporal score for a query is based on events of clicks related to the query, adding items related to the query to a cart, and ordering items related to the query, the index construction module 212 may weight the event of clicking with 0.2, the event of adding to a cart with 0.3 and the event of ordering with 0.5 in calculating the temporal score.

In calculating the temporal scores for queries, the index construction module 212 may measure the passage of time from occurrences of events based on dates. The index construction module 212 may also consider the number of occurrences of events related to the query in calculating the temporal scores.

In some embodiments, the index construction module 212 may calculate the temporal scores based on decay functions using a passage of time from the occurrence of the event as a variable. In some embodiments, the index construction module 212 may calculate the temporal scores based on one or more of the decay functions indicated as F1, F2, F3, F4, and F5 in FIG. 4 using the passage of days from the occurrence of the event as a variable (x).

In some embodiments, the index construction module 212 may calculate more than one type of temporal score for each query. For example, the index construction module 212 may calculate, for each query, a first temporal score based on a first decay function and a second temporal score based on a second decay function which is different from the first decay function. In some embodiments, the index construction module 212 may calculate the first temporal scores based on the sigmoid decay function represented by the formula F1 in FIG. 4 and calculate the second temporal scores based on the exponential decay function represented by the formula F2 in FIG. 4.

When the system supports a plurality of retail channels, the index construction module 212 may calculate channel-specific query scores corresponding to one of the plurality of retail channels CH1, CH2, CH3. The index construction module 212 may calculate the channel-specific query scores based on a passage of time from occurrences of events related to the queries at each channel. For example, the index construction module 212 may calculate the channel-specific query scores for a first channel based on a passage of time from events that occurred only at the first channel.

In some embodiments, the index construction module 212 may calculate more than one type of channel-specific query scores for each of the plurality of channels. In some embodiments, the index construction module 212 may calculate the first channel-specific temporal scores based on a first decay function and the second channel-specific temporal scores based on a second decay function which is different from the first decay function for each of the plurality of channels. For example, the index construction module 212 may calculate the first channel-specific temporal score based on the sigmoid decay function represented by the formula F1 in FIG. 4 and the second channel-specific temporal score based on the exponential decay function represented by the formula F2 in FIG. 4 for each of the plurality of channels.

With the queries and calculated query scores, the index construction module 212 may construct the query index 208. In some embodiments, the index construction module 212 may filter queries based on the number of occurrences of events and use the filtered queries to construct the query index 208. Using filtered queries may improve the quality of the query index.

In some embodiments, the index construction module 212 may construct the search tree 300 of the query index 208 with the queries and calculated query scores. In some embodiments, the index construction module 212 may construct the search tree 300 having a plurality of nodes corresponding to each query. When constructing the search tree 300 with queries, the index construction module 212 may store the queries and the calculated query scores in each of the corresponding nodes of the search tree 300.

After the initial construction of the search tree 300 with queries and query scores, the index construction module 212 may update the search tree 300 with updated clickstream data. In some embodiments, the index construction module 212 may update the search tree in real-time.

In some embodiments, the control circuit 202 may be configured to receive a query prefix. The control circuit 202 may receive the query prefix from the user interface 224 of a retail channel. As used herein, the term "query prefix" refers to a character string input by a user. For example, when a user enters a query prefix at the search bar 106 of the GUI 100 of a retail channel, the control circuit may receive the entered query prefix from the GUI 100. For example, in FIG. 1, the character "i", "c", and "e" are entered at the search bar of the GUI, such that the character string "ice" may be a query prefix in the example of FIG. 1.

In some embodiments, after the control circuit 202 receives, from a user interface, the query prefix entered by a user, the query selection module 214 of the control circuit 202 may be configured to retrieve, based on the query prefix, query candidates and the query scores corresponding to the query candidates from the search tree. The query selection module 214 may be further configured to select, based on the query scores corresponding to the query candidates, one or more query suggestions from the query candidates.

To start a search at the search tree 300, the query selection module 214 may first find a prefix node, which is a node corresponding to the prefix entered by a user, from the search tree. The query selection module may then traverse the search tree from the prefix node based on a modified breadth-first search algorithm, to retrieve query candidates and select query suggestions. Breadth-first search traversal of a search tree is for tracking each node in the search tree that is reached and outputting a list of nodes in breadth-first order, i.e., outputting all nodes at a given level of the tree before outputting any nodes at the next level down in the tree.

In some embodiments, the query selection module 214 may retrieve the query candidates and corresponding query scores by traversing the search tree with a breadth-first search traversal. Queries encountered during the breadth-first search traversal of the search tree from the prefix node may be retrieved as the query candidates. In some embodiments, all queries which are reached during the breadth-first search traversal may be the query candidates.

In some embodiments, the query selection module 214 may select the query suggestions by comparing the query scores of the query candidates during the breadth-first search traversal. In some embodiments, the query selection module 214 may compare the query score of the query candidate of the current node with the query scores of the query candidates of the child nodes in selecting query suggestions. For example, if the query score of the child node is higher than the query score of the current node, the query of the child node may be selected as a query suggestion. In this example, the query of the current node and the queries of the child nodes compared with the current node (including the queries of the child nodes not selected as a query suggestion) may be the query candidates. In some embodiments, the query selection module may select the query of the prefix node as a query suggestion.

When the system is for a plurality of retail channels, such that each node 302 of the search tree 300 includes channel-specific query scores 312, 314, 316 for each channel, the query selection module 214 selects the query suggestions by comparing the channel-specific query scores corresponding to the retail channel where the query prefix is entered via the user interface. By selecting the query suggestions based on the channel-specific query scores, the system 200 may provide more appropriate query suggestions to users.

For example, when the system 200 is used for a first retail channel CH1, a second retail channel CH2, and a third retail channel CH3, each node 302 of the search tree 300 may include channel-specific temporal score(s) 312 for the first channel, channel-specific temporal scores(s) 314 for the second channel and channel-specific temporal score(s) 316 for the third channel. In this example, when a query prefix is entered via a user interface of the second retail channel, the query selection module may select the query suggestions by comparing the channel-specific temporal scores for the second channel of the query candidates.

FIG. 6 is an example pseudocode for getting a prefix node based on a retail channel. FIG. 7 is an example pseudocode, based on a retail channel and a breadth-first search-based algorithm, for retrieving query candidates and corresponding query scores and selecting query suggestions. The term "prefix" in FIGS. 6 and 7 may correspond the query prefix described above. The term "topMatches" in FIG. 7 may correspond the query suggestions selected from the query candidates described above. According to the exemplary pseudocode of FIG. 6, the query selection module traverses over the TST based on the channel where the query prefix was entered to match the prefix in the TST to return a first node from the TST which matches the query prefix as a prefix node. The query selection module starts at a root node of the TST and matches the prefix character by character considering the channel of query and returns the node where the query prefix match ends. According to the exemplary pseudocode of FIG. 7, the query selection module performs a breadth-first search (BFS) on the TST and returns the top matching query suggestions for prefix query based on the retail channel where the query prefix was entered. The query selection module retrieves the prefix node from the TST by traversing from the root node as depicted in FIG. 6. Then, the query selection module initializes a priority queue that stores the top-scoring query suggestion during the BFS traversal of the TST. In each traversal of the TST nodes, when the query selection module reaches a terminal node having a maximum sigmoid decay score, the query selection module adds it to the topMatches array which carries top query suggestions. For all other non-terminal nodes (left, right, center), the query selection module inserts them in the queue if they match the condition of having a higher sigmoid decay score than all other query suggestions currently present in the queue. Finally, the query selection module returns the topMatches suggestions as query suggestions for the query prefix. The pseudocodes are provided as one example of implementing the concepts described herein in computer-executable code. The systems and methods described herein may be variously implemented without departing from the spirit of the present disclosure.

In some embodiments, the reranking module 216 of the control circuit 202 may be configured to sort the selected query suggestions based on the query scores of the selected query suggestions. The reranking module 216 may sort the query suggestion in decreasing order of the query scores.

In some embodiments where each of the plurality of nodes includes a first temporal score based on a first decay function and a second temporal score based on a second decay function, the query selection module 214 may select the query suggestions based on the first temporal scores and the reranking module 216 may sort the selected query suggestions based on the second temporal scores. In some embodiments, the query selection module 214 may select the query suggestions by comparing the first temporal scores based on the sigmoid decay function (F1 in FIG. 4) and the reranking module 216 may sort the selected query suggestions by comparing the second temporal scores based on the exponential decay function (F2 in FIG. 5). By using the first temporal scores based on the sigmoid decay function in selecting the query suggestions, the query suggestions may be selected based on the importance in the relatively long term. By using the second temporal scores based on the exponential decay function in sorting the query suggestions, the query suggestions may be arranged based on the importance in recent days.

In some embodiments where the channel-specific query scores 312, 314, 316 for each of the plurality of channels include first channel-specific temporal scores based on a first decay function and second channel-specific temporal score based on a second decay function which is different from the first decay function, the query selection module 214 may select the query suggestions by comparing the first channel specific temporal scores for the retail channel where the query prefix is entered via a user interface thereof and the reranking module 216 may sort the query suggestions by comparing the second channel specific temporal scores for the same retail channel.

For example, when a query prefix is entered from a user interface of the second retail channel, the query selection module 214 may select the query suggestions by comparing the first channel-specific temporal scores of the query candidates for the second retail channel which is based on the sigmoid decay function. In this example, the reranking module 216 may sort the query suggestions by comparing the second channel-specific temporal scores of the query suggestions for the second channel which is based on the exponential decay function.

FIG. 8 is an example pseudocode for reranking query suggestions based on exponential scores for each of the query suggestions. According to the exemplary pseudocode of FIG. 8, the query suggestions are reranked in decreasing order of the exponential scores. The pseudocode is also provided as one example of implementing the concepts described herein in computer-executable code. The systems and methods described herein may be variously implemented without departing from the spirit of the present disclosure.

In some embodiments, the prefix correction module 218 of the control circuit 202 may be configured to retrieve query correction candidates based on the query prefix entered by a user. In some embodiments, the prefix correction module 218 may be configured to retrieve the query correction candidates in response to retrieving none of the query candidates including the query prefix. For example, the query selection module 214 may try to retrieve the query candidates including the query prefix and when the query selection module 214 finds no query candidates including the entire query prefix, then the prefix correction module 218 may retrieve query correction candidates. Before the prefix correction module 218 retrieves query correction candidates, the query selection module 214 may try to retrieve the query candidates in accordance with the embodiments described hereinbefore.

In some embodiments, the prefix correction module 218 may retrieve, based on the query prefix, the query correction candidates from the query index such that the query correction candidates may be queries stored in the query index. In some embodiments, one or more characters from the beginning of the string of the query candidates may be the same as one or more characters from the beginning of the string of the query prefix. For example, the prefix correction module 218 may retrieve the query correction candidates that have a first character the same as the first character of the query prefix. For example, when the query prefix entered by a user is "ike" and there is no query including "ike" in the query index, then the query correction module 218 may retrieve the query correction candidates including the first character "i" from the query index "ike". In some other examples, the prefix correction module 218 may retrieve the query corrections that have the first two characters the same as the first two characters of the query prefix.

In some embodiments, the prefix correction module 218 may be configured to calculate edit distances for each of the retrieved query correction candidates. The edit distances may be related to a similarity between the query prefix and each of the query correction candidates. In some embodiments, the edit distances may be a numerical representation of minimum edit operations required to transform the string of the query prefix to the string of the query candidate. In some embodiments, the edit distances may be calculated based on Levenshtein distance representing the smallest number of edit operations required to transform one string into another string.

The prefix correction module 218 may be configured to select, based on the edit distances, one or more query suggestions from the query correction candidates. For example, the prefix correction module 218 may select a query correction candidate as a query suggestion when the query correction candidate or prefixes of the query correction candidate have an edit distance same or lower than a predetermined threshold value. The predetermined threshold value of the edit distance may be a positive integer.

In some embodiments, the prefix correction module 218 may further be configured to calculate a prefix completion cost for each of the query suggestions selected from the query correction candidates. The prefix completion costs may be calculated based on the edit distances.

Figure 9:
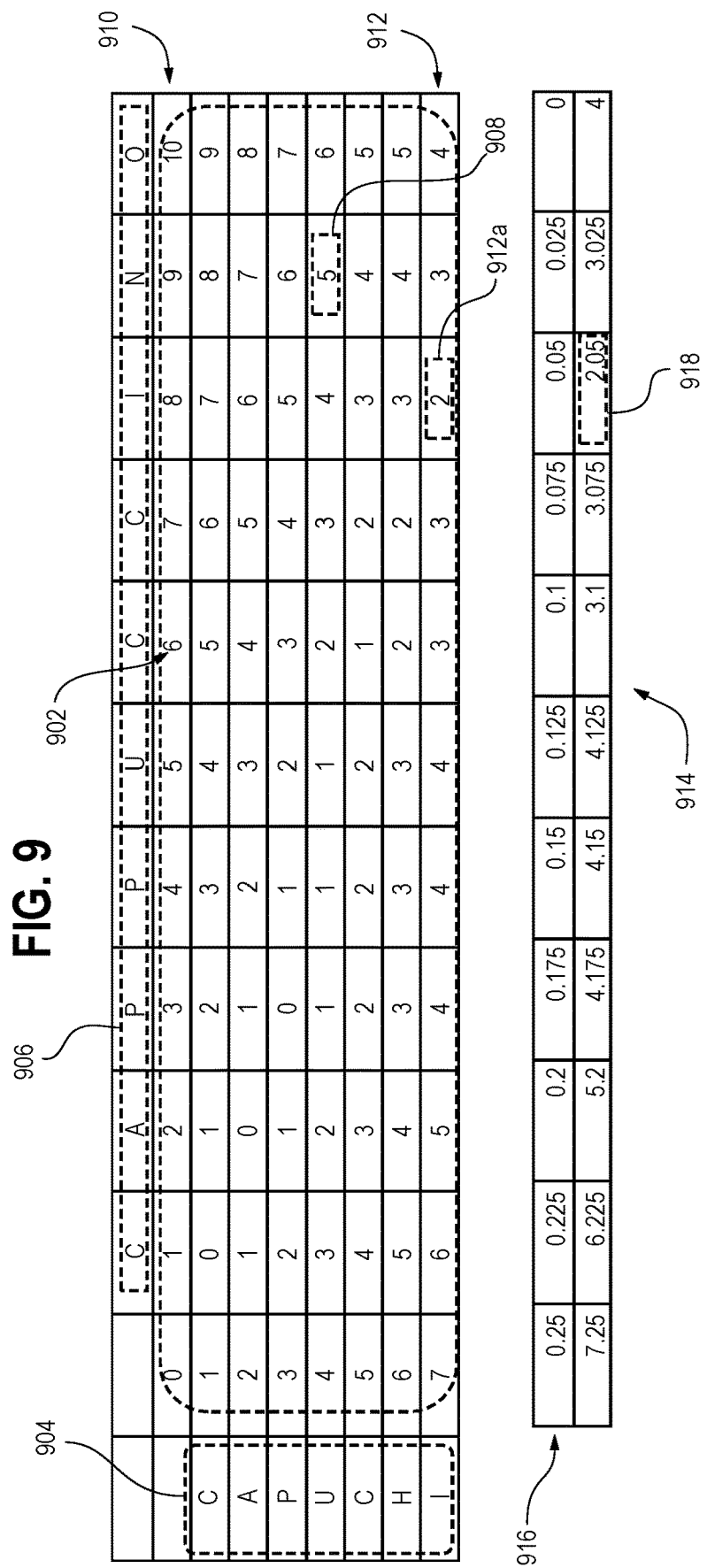
FIG. 9 depicts an exemplary distance matrix and table to illustrate a method of calculation of edit distances and prefix completion costs in accordance with some embodiments.

FIG. 9 depicts a distance matrix 902 and a table 914 to illustrate a method of calculation of the edit distances and prefix completion costs according to one example embodiment. The example in FIG. 9 uses "CAPUCHI" as a query prefix and "CAPPUCCINO" as a query correction candidate. Each of matrix values 908 may represent the smallest number of edit operations required to transform each character of query prefix into each character of query correction candidates. The matrix value 908 may be calculated based on the Levenshtein algorithm.

The first row of the distance matrix may be the column index 910. For example, 2 in the first row of the matrix 902 under the character A may indicate that this column is for the second character in the query correction candidate "CAPPUCCINO".

The last row of the distance matrix 902 may represent edit distances 912 required to modify the query prefix into a part or entire string of the query correction candidate up to the corresponding column (i.e., a prefix of the query correction candidate up to the corresponding column). If the query correction candidate has an edit distance that is the same or lower than the predetermined threshold value, then the query correction candidate may be selected as a query suggestion. In the example of FIG. 9, the threshold value of the edit distance to select the query suggestion has been predetermined as "2". Because the column of "I" corresponding to the prefix "CAPPUCCI" of the query correction candidate "CAPPUCCINO" has an edit distance the same as the threshold value "2", the query correction candidate "CAPPUCCINO" may be selected as a query suggestion.

In FIG. 9, the first row in the table 914 may be target length completion costs 916. The target length completion costs 916 may be calculated by subtracting the value of the column index 910 corresponding to each column from a target length of the query correction candidate (i.e., the total number of characters of the query correction candidate) and then multiplying it by a prefix unit cost. In the example of FIG. 9, the target length is 10 because the total number of characters of "CAPPUCCINO" is 10 The prefix unit cost may be a pre-determined constant. In the example of FIG. 9, "0.025" has been used as the prefix unit cost.

For example, one of target length completion costs 916 "0.125" corresponding to the character "U" of the query correction candidate "CAPPUCCINO" may be calculated by the formula: prefix unit cost "0.025"×(target length "10"–column index value "5").

Then, the prefix completion cost 918 of the query correction candidate "CAPPUCCINO" may be calculated by adding the target length completion cost corresponding to the minimum edit distance 912*a* to the minimum edit distance 912*a*. For example, in the example of FIG. 9, the target length completion cost corresponding to the minimum edit distance 912*a* is "0.05". Thus, the prefix completion costs of the selected query suggestion "CAPPUCCINO" may be 2.05, which is the sum of the minimum edit distance "2" and corresponding target length completion cost "0.05".

In some embodiments, the prefix correction module 218 may be further configured to calculate query correction costs for each of the query suggestions selected from the query correction candidates based on the prefix completion costs 918 and query scores 306. When the system is for a plurality of retail channels, the query scores used in the calculation of the query correction costs may be the channel-specific query scores.

In some embodiments, the prefix correction module 218 may normalize the query scores 306 in calculating the query correction costs. The prefix correction module 218 may normalize the query scores 306 based on the equation:

$$\frac{\log(\text{query score})}{\log(\text{maximum query score})}.$$

In some embodiments, the prefix correction module 218 may calculate the query correction costs for each query suggestion selected from the query correction candidates based on the following equation:

$$\text{prefix completion cost} + \text{weight} \times \left(1 - \frac{\log(\text{query score})}{\log(\text{maximum query score})}\right).$$

According to the above equation to calculate the query correction costs, the query correction module 218 consider not only the prefix completion costs but the query scores such that the query correction costs may penalize the queries with high prefix completion cost and reward the queries with good query scores.

In the above equation to calculate the query correction costs, the weight may be a predetermined value. In the above equation to calculate the query correction costs, increasing the predetermined value of the weight may increase the effect of rewarding the queries with good query scores. In some embodiments, the predetermined value of the weight may be a positive number. In some embodiments, the predetermined value of the weight may be greater than 0 and smaller than 1. In one approach, the weight may be 0.7.

In some embodiments, the prefix correction module 218 may be configured to sort the query suggestions selected from the query correction candidates. The prefix correction module 218 may sort the query suggestions based on the query correction costs such that the system may generate the query suggestions penalizing the queries with high prefix completion costs and rewarding the queries with good query scores.

In some embodiments, the prefix correction module 218 may be configured to sort the query suggestions selected from the query correction candidates in increasing order of the query correction costs.

FIG. 10 is an example pseudocode for calculating the edit distances and prefix completion costs. The term "prefix" in FIG. 10 may correspond the query prefix described above. The term "target" in FIG. 10 may correspond the query correction candidate described above. FIG. 11 is an example pseudocode for selecting query suggestions from the query correction candidates based on the edit distances and sorting the query suggestions based on prefix completion costs and query scores. The term "prefixCompeleCost score" in FIG. 11 may correspond the prefix completion cost described above. The term "condidateTotalCost" in FIG. 11 may correspond the query correction cost described above. According to the exemplary pseudocode in FIG. 10, the edit distance between the query prefix entered and query correction candidates may be computed using the Levenshtein distance method. The prefix completion cost may be added by considering the length difference between the target-Length and the position till prefixLength (length of the prefix of the query correction candidate). The prefixUnit-Cost may be the weight associated with a unit length difference between the target query (query correction candidate) and prefix length (length of the prefix of the query correction candidate) till the position the prefix correction module considers. The prefix correction module computes a penalty by multiplying prefixUnitCost with the length difference. The combination of edit distance and penalty makes the complete prefixCompletionCost (prefix completion cost). The prefix correction module considers the minimum prefixCompletionCost to select the target query (query correction candidate) as a query suggestion. According to the exemplary pseudocode of FIG. 11, the prefix correction module retrieves all the target suggestions (query suggestions) for a query prefix. [For each query suggestion, the prefix correction module considers the quality of the target suggestion (query suggestions) using their sigmoid scores and its prefixCompletionCost (prefix completion cost) to compute the candidateTotalCost (query correction cost).] [For each query suggestion, the prefix correction module computes a weighted query quality score by considering sigmoid score as well as prefixCompletionCost. Combination of this weighted query quality score and prefixCompletionCost (prefix completion cost) generates the candidateTotalCost (query correction cost).] Finally, the query correction module sorts all the query suggestions in increasing order of candidateTotalCost (query correction cost) to select best target query suggestion (query suggestions) having minimum candidateTotalCost (query correction cost). These pseudocodes are provided also as one example of implementing the concepts described herein in computer-executable code. The systems and methods described herein may be variously implemented without departing from the spirit of the present disclosure.

In some embodiments, the control circuit 202 may further include a product suggestion module 220. The product suggestion module 220 may be configured to retrieve, from the product index, product suggestions related to the query suggestions.

The product suggestion module 220 may retrieve the product suggestions related to the query suggestions selected by the query selection module 214 and/or the query suggestions selected by the prefix correction module 218. The product suggestion module 220 may retrieve the product suggestions by comparing the selected query suggestions and product-related queries stored in the product index. In retrieving the product suggestions, the product suggestion module 220 may consider the product affinity scores based on the clickstream data of each product with decay rate on the interactions such as click, adding to a card, on order, and so on.

In some embodiments, the control circuit 202 may construct the product index 210 from the clickstream data. In some embodiments, the control circuit 202 may use the clickstream data of the previous 120 days in constructing the product index. The control circuit 202 may extract queries, product identifications (IDs), occurrences of events related to products such as clicks the products related to the queries, adding products related to the query to a cart, ordering products related to the queries, visiting products related to the queries, and so on, and the dates of the occurrences of the events. The control circuit 202 may preprocess and filter the extracted queries. The control circuit 202 may filter the queries based on the number of occurrences of events related to the products. In some embodiments, the control circuit 202 may calculate the temporal scores for pairs of a query and a product ID based on decay functions using a passage of time from the occurrence of the event as a variable. The temporal scores for the pairs of a query and a product ID may be calculated in the same or similar manner to the calculation of the temporal scores for queries described herein. In some embodiments, the control circuit 202 may rank product IDs per query. For example, when there is a plurality of product IDs related to a query, the product ID related to the query may rank against one another based on the calculated temporal scores. In some embodiments, the control circuit 202 may filter out-of-stocked product IDs. In some embodiments, the control circuit 202 may construct the product index with the extracted and filtered queries, product IDs, and calculated temporal scores.

In some embodiments, the control circuit 202 may be further configured to present, via the user interface, the query suggestions. In some embodiments, the control circuit may present the query suggestions selected by the query selection module and sorted by the reranking module 216. In some embodiments, the control circuit 202 may present the query suggestions selected and sorted by the prefix correction module 218. The control circuit 202 may present the query suggestions via the query suggestion section 102 of the GUI 100.

In some embodiments, the control circuit 202 may be further configured to present, via the user interface, the product suggestions. The control circuit 202 may present the product suggestions via the product suggestion section 104 of the GUI 100. In some embodiments, the control circuit may output and present, via the user interface, the product suggestions together with the query suggestions.

In some embodiments, the query index 208 and the product index 210 may be stored in a memory 204 coupled to or integrated with the control circuit 202 of a single computing device 240. In some embodiments, the query index 208 and the product index 210 may be stored in a RAM coupled to or integrated with the control circuit 202 of a single computing device 240. The RAM storing the query index 208 and the product index 210 may be 24 GB or less than 24 GB.

In some embodiments, the system may include a plurality of computing devices 240. In some embodiments of the systems and methods described here, processes for providing query suggestions, product suggestions and/or pre-fix correction may all be executed on the processor and RAM of each single computing device of the plurality of computing devices. Each of the plurality of computing devices 240 may be parallelly connected via the network such that even when some computing devices are delayed or do not work, the remaining computing devices may execute processes for providing query suggestions, product suggestions and/or pre-fix correction. Thus, in some embodiments of the systems and methods described here, stable and substantially delay-free query suggestions, product suggestions and/or pre-fix correction may be provided.

Figure 12:
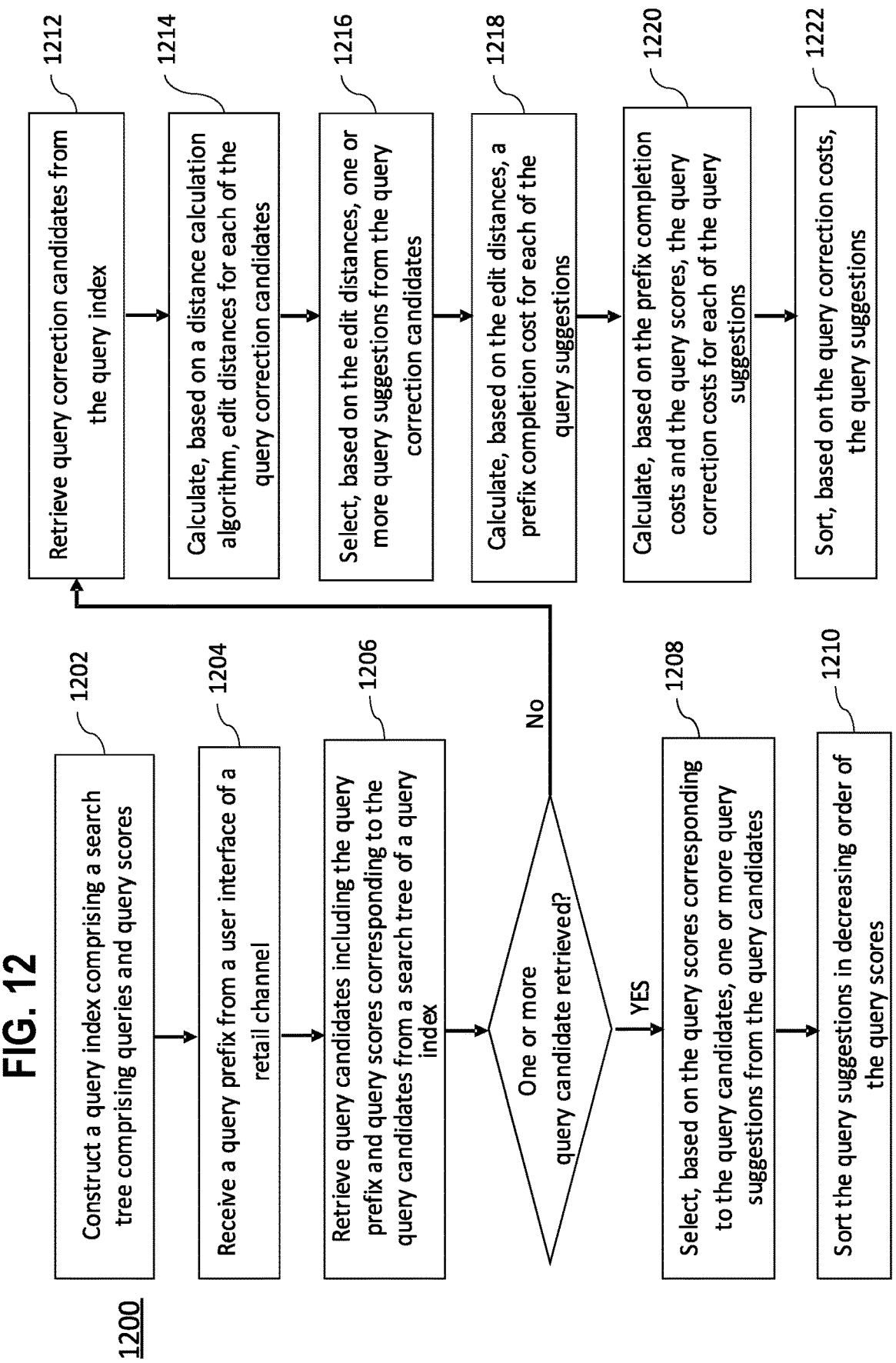
FIG. 12 is a flowchart depicting an example method for generating query suggestions for retail in accordance with some embodiments.

FIG. 12 is a flowchart depicting an example method 1200 for generating query suggestions for retail that may be performed using a system in accordance with the embodiments described above. For example, the method 1200 may be performed using the exemplary system 200 depicted in FIG. 2. The flow begins at block 1202.

At block 1202, the index construction module 212 of the control circuit may construct and update the query index 208. In some embodiments, to construct the query index 208, the index construction module 212 may calculate query scores for queries based on the clickstream data. The index construction module 212 may calculate temporal scores for each query based on a passage of time from an occurrence of events related to each query. In some embodiments, when temporal scores are based on more than one event, the events may be weighted in calculating the temporal scores.

In calculating the temporal scores for queries, the index construction module 212 may measure the passage of time from occurrences of events based on dates. The index construction module 212 may also consider the number of occurrences of events related to the query in calculating the temporal scores.

In some embodiments, index construction module 212 may calculate the temporal scores based on decay functions using a passage of time from the occurrence of the event as a variable.

In some embodiments, the index construction module 212 may calculate more than one type of temporal score for each query. For example, the index construction module 212 may calculate, for each query, a first temporal score based on a first decay function and a second temporal score based on a second decay function which is different from the first decay function.

When the system is for a plurality of retail channels, the index construction module 212 may calculate channel-specific query scores corresponding to one of the plurality of retail channels. The index construction module 212 may calculate the channel-specific query scores based on a passage of time from occurrences of events related to the queries at each channel. For example, the index construction module 212 may calculate the channel-specific query scores for a first channel based on a passage of time from events that occurred only at the first channel.

In some embodiments, the index construction module 212 may calculate more than one type of channel-specific query scores for each of the plurality of channels. In some embodiments, the index construction module 212 may calculate the first channel-specific temporal scores based on a first decay function and the second channel-specific temporal scores based on a second decay function which is different from the first decay function for each of the plurality of channels.

With the queries and calculated query scores, the index construction module 212 may construct the query index 208. In some embodiments, the index construction module 212 may filter queries based on the number of occurrences of events and use the filtered queries to construct the query index 208.

In some embodiments, the index construction module 212 may construct the search tree 300 of the query index 208 with the queries and calculated query scores. In some embodiments, the index construction module 212 may construct the search tree 300 having a plurality of nodes corresponding to each query. When constructing the search tree 300 with queries, the index construction module 212 may store the queries and the calculated query scores in each of the corresponding nodes of the search tree 300. The flow continues at block 1204.

At block 1204, the control circuit 202 may receive a query prefix. The control circuit 202 may receive the query prefix from the user interface 224 of a retail channel. The flow continues at block 1206.

At block 1206, the query selection module 214 of the control circuit 202 may retrieve, based on the query prefix, query candidates and the query scores corresponding to the query candidates from the search tree. In some embodiments, the query selection module 214 may retrieve the query candidates and corresponding query scores by traversing the search tree 300 with a breadth-first search traversal. Queries encountered during the breadth-first search traversal of the search tree from the prefix node may be retrieved as the query candidates. When the query selection module 214 retrieve at least one query candidate including the query prefix, the flow continues at block 1208. (As described later, when the query selection module 214 retrieves none of query candidates including the query prefix at block 1206, then the flow continues at block 1212.)

At block 1208, the query selection module 214 may select, based on the query scores corresponding to the query candidates, one or more query suggestions from the query candidates. In some embodiments, the query selection module 214 may select the query suggestions by comparing the query scores of the query candidates during the breadth-first search traversal. In some embodiments, the query selection module 214 may compare the query score of the query candidate of the current node with the query scores of the query candidates of the child nodes in selecting query suggestions. For example, if the query score of the child node is higher than the query score of the current node, the query of the child node may be selected as a query suggestion.

When the method is for a plurality of retail channels, such that each node 302 of the search tree 300 includes channel-specific query scores 312, 314, 316 for each channel, the query selection module 214 may select the query suggestions by comparing the channel-specific query scores corresponding to the retail channel where the query prefix is entered via the user interface. The flow continues at block 1210.

At block 1210, the reranking module 216 of the control circuit 202 may sort the selected query suggestions based on the query scores of the selected query suggestions. The reranking module 216 may sort the query suggestion in decreasing order of the query scores.

In some embodiments where each of the plurality of nodes includes a first temporal score based on a first decay function and a second temporal score based on a second decay function, the query selection module 214 may select the query suggestions based on the first temporal scores and the reranking module 216 may sort the selected query suggestions based on the second temporal scores. In some embodiments, the query selection module 214 may select the query suggestions by comparing the first temporal scores based on the sigmoid decay function (F1 in FIG. 4) and the reranking module 216 may sort the selected query suggestions by comparing the second temporal scores based on the exponential decay function (F2 in FIG. 5).

In some embodiments where the channel-specific query scores 312, 314, 316 for each of the plurality of channels include first channel-specific temporal scores based on a first decay function and second channel-specific temporal score based on a second decay function which is different from the first decay function, the query selection module 214 may select the query suggestions by comparing the first channel specific temporal scores for the retail channel where the query prefix is entered via a user interface thereof and the reranking module 216 may sort the query suggestions by comparing the second channel specific temporal scores for the same retail channel.

At block 1206, when the query selection module 214 retrieves none of query candidates including the query prefix, then the flow continues at block 1212 instead of block 1208.

At block 1212, the prefix correction module 218 of the control circuit 202 may retrieve, based on the query prefix entered by a user, query correction candidates from the query index. In some embodiments, the prefix correction module 218 may retrieve the query correction candidates in response to retrieving none of the query candidates including the query prefix by the query selection module at block 1206.

Still at block 1212, in some embodiments, one or more characters from the beginning of the string of the query candidates may be the same as one or more characters from the beginning of the string of the query prefix. The flow continues at block 1214.

At block 1214, the prefix correction module 218 may calculate edit distances for each of the retrieved query correction candidates. In some embodiments, the edit distances may be calculated based on Levenshtein distance. The flow continues at block 1216.

At block 1216, the prefix correction module 218 may select, based on the edit distances, one or more query suggestions from the query correction candidates. In some embodiments, the prefix correction module 218 may select a query correction candidate as a query suggestion when the query correction candidate or prefixes of the query correction candidate have an edit distance same as or lower than a predetermined threshold value. The flow continues at block 1218.

At block 1218, the prefix correction module 218 may calculate a prefix completion cost for each of the query suggestions selected from the query correction candidates. The prefix completion costs may be calculated based on the edit distances.

In some embodiments, in calculating a prefix completion cost, the prefix correction module 218 may calculate target length completion costs 916. the prefix correction module 218 may calculate the target length completion costs 916 by subtracting the value of the column index 910 corresponding to each column from a target length of the query correction candidate (i.e., the total number of characters of the query correction candidate) and then multiplying it by a prefix unit cost. The prefix unit cost may be a pre-determined constant.

Then, the prefix correction module 218 may calculate the prefix completion cost 918 of the query correction candidate by adding the target length completion cost corresponding to the minimum edit distance 912a to the minimum edit distance 912a. The flow continues at block 1220.

At block 1220, the prefix correction module 218 may calculate query correction costs for each of the query suggestions selected from the query correction candidates based on the prefix completion costs 918 and query scores 306. In some embodiments, the prefix correction module 218 may normalize the query scores 306 in calculating the query correction costs. The prefix correction module 218 may normalize the query scores 306 based on the equation:

$$\frac{\log(\text{query score})}{\log(\text{maximum query score})}.$$

In some embodiments, the prefix correction module 218 may calculate the query correction costs for each query suggestion selected from the query correction candidates based on the following equation:

$$\text{prefix completion cost} + \text{weight} \times \left(1 - \frac{\log(\text{query score})}{\log(\text{maximum query score})}\right).$$

In the above equation to calculate the query correction costs, the weight may be a predetermined value. In some embodiments, the predetermined value of the weight may be greater than 0 and smaller than 1. In one approach, the weight may be 0.7. The flow continues at block 1222.

At block 1222, the prefix correction module 218 may sort the query suggestions selected from the query correction candidates. The prefix correction module 218 may sort the query suggestions based on the query correction costs such that the method may generate the query suggestions penalizing the queries with high prefix completion costs and rewarding the queries with good query scores.

In some embodiments, the prefix correction module 218 may sort the query suggestions selected from the query correction candidates in an increasing order of the query correction costs. The flow ends either at block 1210 or block 1222.

In some embodiments, the method 1200 may further comprise retrieving, with the product suggestion module 220, product suggestions related to the query suggestions from the product index. The product suggestion module 220 may retrieve the product suggestions related to the query suggestions selected at block 1208 by the query selection module 214 and/or the query suggestions selected at block 1216 by the prefix correction module 218. The product suggestion module 220 may retrieve the product suggestions by comparing the selected query suggestions and product-related queries stored in the product index. In retrieving the product suggestions, the product suggestion module 220 may consider the product affinity scores based on the clickstream data of each product with decay rate on the interactions such as click, adding to a card, on order, and so on.

In some embodiments, the method may further comprise presenting, with the control circuit and via the user interface, the query suggestions. In some embodiments, the control circuit may present the query suggestions selected at block 1208 by the query selection module and sorted at block 1210 by the reranking module 216. In some embodiments, the control circuit 202 may present the query suggestions selected at block 1216 and sorted at block 1222 by the prefix correction module 218. The control circuit 202 may present the query suggestions via the query suggestion section 102 of the GUI 100.

In some embodiments, the method may further comprise presenting, with the control circuit and via the user interface, the product suggestions. The control circuit 202 may present the product suggestions via the product suggestion section 104 of the GUI 100. In some embodiments, the control circuit 202 may output and present, via the user interface 224, the product suggestions together with the query suggestions.

In some embodiments, the system 200 may include a plurality of computing devices 240, each of which may include the control circuit 202 and the memory 204 according to the embodiments described herein. In some embodiments, the described steps performed at blocks 1202, 1204, 1206, 1208, 1210, 1212, 1214, 1216, 1218, 1220, and 1222 may be performed using the memory 204 and the control circuit 202 of the single computing device 240. In some embodiments, the described steps performed at blocks 1202, 1204, 1206, 1208, 1210, 1212, 1214, 1216, 1218, 1220, and 1222 may be performed using the control circuit 202 and 24 GB or less than 24 GB of RAM coupled to or integrated with the control circuit of the single computing device 240. In some embodiments, the described steps performed at blocks 1202, 1204, 1206, 1208, 1210, 1212, 1214, 1216, 1218, 1220, and 1222 may be performed using the control circuit 202 and 8 GB coupled to or integrated with the control circuit of the single computing device 240.

Figure 13:
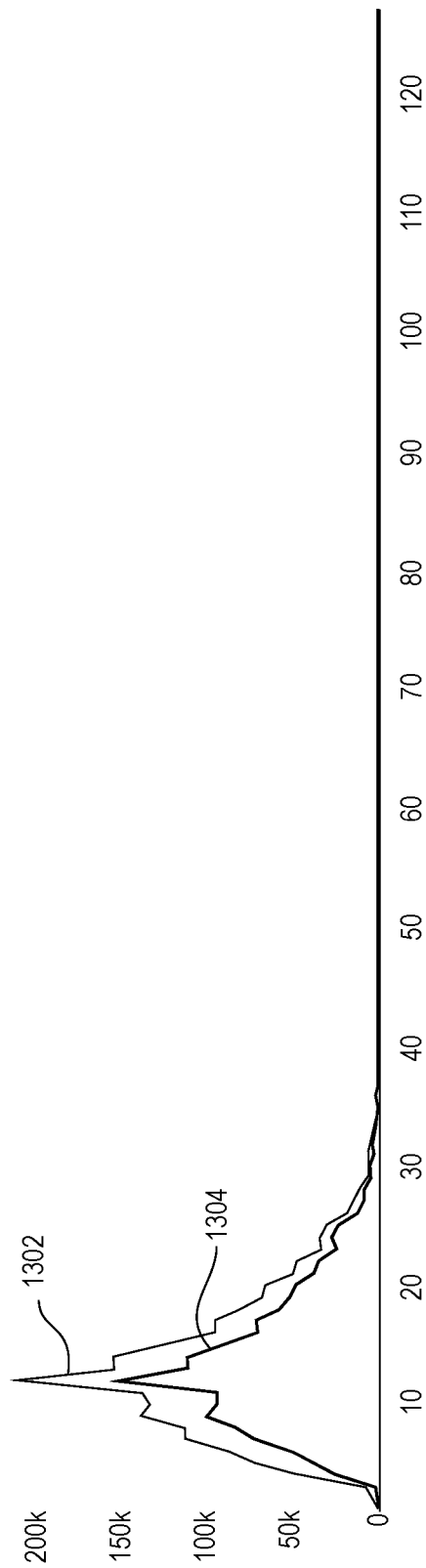
FIG. 13 depicts exemplary counts of saved keystrokes in accordance with some embodiments.

FIG. 13 depicts counts of saved keystrokes 1302 according to the system and method of some embodiments the present disclosure and counts of saved keystrokes 1304 according to a control system and method of under certain test conditions. In FIG. 13, BLOOMREACH's query suggestion tool was used as the control. In FIG. 13, the x-axis indicates saved keystrokes by users when the users input a query prefix, and the y-axis indicates counts of customer search requests. The saved keystrokes were counted by the difference between the length of the query selected by the users from the query suggestions and the length of the query prefix typed by users. The area between a line 1302 and a line 1304 shows the additionally saved efforts of the customers by the present disclosure compared to the control.

FIG. 14 is a table showing A/B test results comparing the system and method of some embodiments the present disclosure ("Test") and BLOOMREACH's query suggestion tool ("Control") under certain test conditions. As shown in FIG. 14, the system and method of the present disclosure have significantly higher autosuggest usage rates 1402, 1404. Autosuggest usage rates 1404, 1406 refer to the rate of customers' usage of the query suggestions provided by the systems. The system and method of the present disclosure also have a higher product recommendation usage rate 1408 than the control. Product recommendation usage rate 1408 refers to the rate of customers' usage of the product suggestions provided by the systems. Further, the system and method of the present disclosure have a lower null query suggestion rate (1406) than the control. Furthermore, compared to the control, the system and method of the present disclosure increase the performance and throughput of query suggestions by 89% and reduce the latency in providing query suggestions by 95% (from 225 ms to 25 ms).

In some embodiments, a system for generating query suggestions comprises a database comprising a query index including queries and query scores corresponding to each of the queries, and a control circuit coupled to the database and configured to receive a query prefix from a user interface, retrieve, from the query index and based on the query prefix, query correction candidates, calculate, based on a distance calculation algorithm, edit distances for each of the query correction candidates from the query prefix, select, based on the edit distances, one or more query suggestions from the query correction candidates, calculate, based on the edit distances, a prefix completion cost for each of the query suggestions, calculate, based on the prefix completion costs and the query scores, the query correction costs for each of the query suggestions, and sort, based on the query correction costs, the query suggestions.

In some embodiments, a method for generating query suggestions comprises receiving, with a control circuit coupled to a database, a query prefix from a user interface, retrieving, with the control circuit and based on the query prefix, query correction candidates from a query index of the database, the query index including queries and query scores corresponding to each of the queries, calculating, with the control circuit and based on a distance calculation algorithm, edit distances for each of the query correction candidates from the query prefix, selecting, with the control circuit and based on the edit distances, one or more query suggestions from the query correction candidates, calculating, with the control circuit and based on the edit distances, a prefix completion cost for each of the query suggestions, calculating, with the control circuit and based on the prefix completion costs and the query scores, the query correction costs for each of the query suggestions, and sorting, with the control circuit and based on the query correction costs, the query suggestions.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for generating query suggestions, the system comprising:
 a processor;
 a database comprising a query index including queries and query scores corresponding to each of the queries; and
 a control circuit implemented on the processor, the control circuit coupled to the database and configured to:
  receive a query prefix from a user interface;
  retrieve, from the query index and based on the query prefix, query correction candidates;

calculate, based on a distance calculation algorithm, edit distances for each of the query correction candidates from the query prefix;
select, based on the edit distances, one or more query suggestions from the query correction candidates;
calculate, based on the edit distances, a prefix completion cost for each of the query suggestions;
calculate, based on the prefix completion costs and the query scores, the query correction costs for each of the query suggestions; and
sort, based on the query correction costs, the query suggestions.

2. The system of claim 1 wherein the edit distances are related to a similarity between the prefix and each of the query correction candidates.

3. The system of claim 1 wherein the control circuit is further configured to:
retrieve query candidates including the query prefix; and
retrieve, in response to retrieving none of the query candidates including the query prefix, the query correction candidates based on the query prefix.

4. The system of claim 1 wherein the control circuit is configured to calculate the edit distances based on a Levenshtein algorithm.

5. The system of claim 1 wherein the control circuit is further configured to normalize the query scores and wherein the query correction costs are based on the prefix completion costs and the normalized query scores.

6. The system of claim 1 wherein the control circuit is configured to calculate the query correction costs for each of the query suggestions based on an equation:

$$\text{prefix completion cost} + \text{weight} \times \left(1 - \frac{\log(\text{query score})}{\log(\text{maximum query score})}\right)$$

and wherein sorting the query suggestions is based on the query correction costs for the query suggestions.

7. The system of claim 6 wherein the control circuit is configured to sort the query suggestions in increasing order of the query correction costs.

8. The system of claim 1 wherein a first character of the query correction candidates is the same as a first character of the query prefix.

9. The system of claim 1 wherein the control circuit is further configured to present, via the user interface, the query suggestions.

10. The system of claim 1 wherein the user interface is of a retail channel, the database further comprising a product index and wherein the control circuit is further configured to retrieve, from the product index, product suggestions related to the query suggestions.

11. A method for generating query suggestions, the method comprising:
receiving, with a control circuit coupled to a database, a query prefix from a user interface;
retrieving, with the control circuit and based on the query prefix, query correction candidates from a query index of the database, the query index including queries and query scores corresponding to each of the queries;
calculating, with the control circuit and based on a distance calculation algorithm, edit distances for each of the query correction candidates from the query prefix;
selecting, with the control circuit and based on the edit distances, one or more query suggestions from the query correction candidates;
calculating, with the control circuit and based on the edit distances, a prefix completion cost for each of the query suggestions;
calculating, with the control circuit and based on the prefix completion costs and the query scores, the query correction costs for each of the query suggestions; and
sorting, with the control circuit and based on the query correction costs, the query suggestions.

12. The method of claim 11 wherein the edit distances are related to a similarity between the prefix and each of the query correction candidates.

13. The method of claim 11 further comprising:
retrieving, with the control circuit, query candidates including the query prefix; and
retrieving, with the control circuit and in response to retrieving none of the query candidates including the query prefix, the query correction candidates based on the query prefix.

14. The method of claim 11 wherein calculating the edit distances is based on a Levenshtein algorithm.

15. The method of claim 11 further comprising normalizing the query scores and wherein calculating the query correction costs is based on the prefix completion costs and the normalized query scores.

16. The method of claim 11 wherein calculating query correction costs for each of the query suggestions is based on an equation:

$$\text{prefix completion cost} + \text{weight} \times \left(1 - \frac{\log(\text{query score})}{\log(\text{maximum query score})}\right)$$

and wherein sorting the query suggestions is based on the query correction costs for the query suggestions.

17. The method of claim 16 wherein the step of sorting the query suggestions is sorting the query suggestions in increasing order of the query correction costs.

18. The method of claim 11 wherein a first character of the query correction candidates is the same as a first character of the query prefix.

19. The method of claim 11 further comprising presenting, via the user interface, the query suggestions.

20. The method of claim 11 further comprising retrieving, from a product index of the database, product suggestions related to the query suggestions, wherein the user interface is of a retail channel.

* * * * *